KENZO AIHARA AND
HIDEO HIROKAWA
INVENTORS

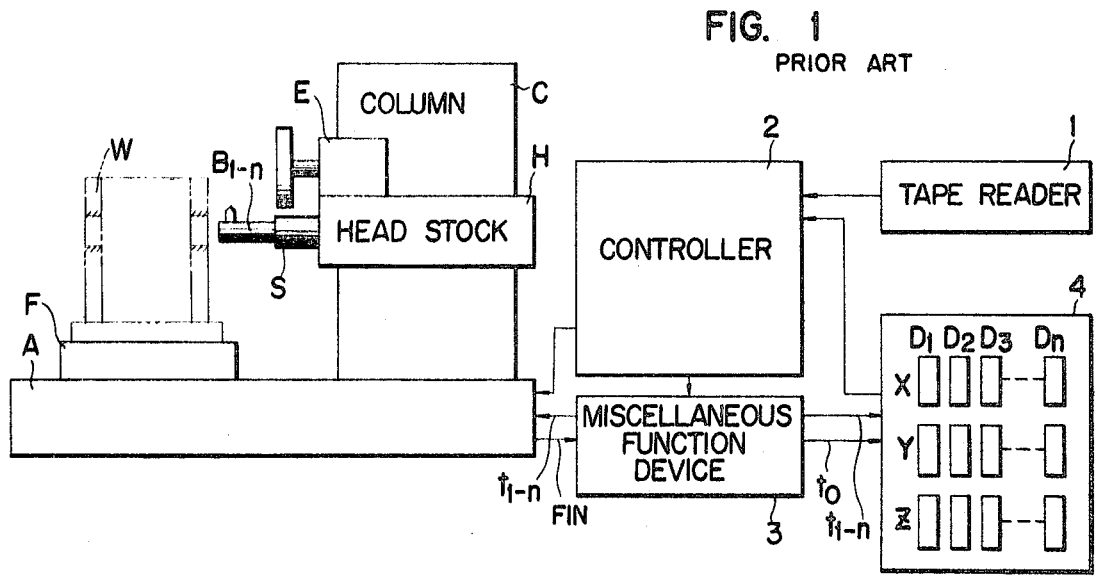

United States Patent Office 3,623,216
Patented Nov. 30, 1971

3,623,216
AUTOMATIC TOOL POSITION COMPENSATING SYSTEM FOR A NUMERICALLY CONTROLLED MACHINE TOOL
Kenzo Aihara, Tokyo, and Hideo Hirokawa, Kawasaki, Japan, assignors to Ikegai Tekko Kabushiki Kaisha, Minato-ku, Tokyo, Japan
Filed July 10, 1969, Ser. No. 840,737
Claims priority, application Japan, July 17, 1968, 43/49,916
Int. Cl. B23q 3/157
U.S. Cl. 29—568                    1 Claim

ABSTRACT OF THE DISCLOSURE

Further, as described in U.S. application S.N. 839,723, filed July 7, 1969 in the names of Tanabe et al. and assigned to the assignee of the present application, by constructing the main spindle S thereof while maintaining a definite position relative thereto. The measuring element coupled to a controller for the machine tool for sensing the dimensions of the workpiece upon receipt of a command signal from a tape reader through the controller. It produces a tool deviation signal representative of the differences between the sensed dimensions and the dimensions called for by command information read by said tape reader. A measured signal processor is coupled to the measuring element and the controller and to a miscellaneous function device for calculating the deviation between the measured dimension and the corresponding programmed dimensions from the output from the measuring element and to memorize the result of the calculation as a compensating value. The compensating value memorized in the measured signal processer is transmitted to the controller as pulses so that the compensation of the position of the cutting tools and the table of the machine can be carried out automatically, depending on the dimensions sensed by the measuring means.

BACKGROUND OF THE INVENTION

The present invention relates to a numerically controlled machine tool and more particularly to an automatic tool position compensating system for automatically measuring and compensating for errors in the dimensions of machined portions of a workpiece due to machining errors or wear and the like of the cutting tools as the machining progresses in such a numerically controlled machine tool, especially a boring machine, a machining center or the like.

In a conventional numerically controlled boring machine or machining center, when the cutting tool tips do not precisely coincide with the basic positions previously programmed or they deviate from the basic positions due to progressive tool wear, the amount and direction of such deviations are pre-set by push-buttons or dials on a tool off-set compensator, and the cutting tools selected by miscellaneous function signals are then moved according to the values previously set by the corresponding push-buttons or dials of the compensator.

However, even though the tools are set precisely to the basic positions defined by the program when the apparatus is stationary, errors inevitably occur in the tool positions due to mechanical distortion or temperature changes of the tools caused by the cutting force exerted simultaneously with the cutting, which conditions are different from those when the apparatus is stationary. Accordingly, in the conventional tool off-set compensating device as described above, the operator, after setting the tools, upon completion of a test piece, needs to remeasure the turned portions precisely by a measuring instrument such as a micrometer, and if he finds errors in said portions, he must manually set the direction and amount of compensation of the tools on the tool off-set compensator. Similarly, after certain intervals of time during the processing of the workpieces by the numerically controlled process, the operator must remeasure the dimensions of the workpieces precisely, and if he finds that the wear of tools exceeds the tolerable limits, he must manually set the amount of the deviation due to such tool wear on the tool off-set compensator. However, such manual measurement and setting of the deviations on the tool off-set compensator requires great skill and complicated manipulations on the part of the operator and human errors are liable to occur. In addition, in a conventional numerically controlled boring machine or machining center, the compensation for the deviations is carried out for three directions, that is, for the X-, Y- and Z-directions, and the compensations for deviations in the X- and Y-directions due to the radial wear of the milling cutters or in the Z-direction due to the axial wear of the boring tools, drills or reamers are possible. However, such compensations do not take into account the diameter changes due to the wear of the tip of the boring tools, so that it is necessary to stop the machine tool when it is necessary to compensate for this type of deviation because this involves the manual fine adjustment of the tool tip in a cartridge type tool. Accordingly, continuous machining according to a numerically controlled process by the use of a high-precision machine tool is very difficult in actual practice.

Furthermore, there is in existence a conventional numerically controlled machine tool in which, for instance, a machining center is provided with storage means for storing a plurality of tools and a tool exchange device. In addition to the tools, the storage means also includes a measuring instrument to measure the machined portions of the workpiece, and during the machining process, at the occurrence of a programmed instuction, the measuring instrument is automatically positioned on the main spindle of the machine tool by the tool exchanging device to measure the dimensions of the machined portions which are to be checked. Signals which depend on the measurement are transmitted to the compensator, for example in the form of an electrical signal, and the program is modified (see U.S. Pat. No. 3,191,294) according to signals from the compensator. However, such an apparatus has a very complicated construction and thus is very costly. Further since it is necessary to move the tool from the main spindle each time a measurement is made, and after the measurement is completed, to replace it, is difficult to carry out the machining process efficiently.

SUMMARY OF THE INVENTION

It is an object of the present invention to provide an automatic tool position compensation system for a numerically controlled machine tool wherein the setting of the tools at the beginning of the operation need not be done as precisely as in a conventional numerically controlled tool.

Another object of the present invention is to provide an automatic tool position compensation system for a numerically controlled machine tool wherein a decrease in the accuracy of the dimensions of the machined portions of the workpiece due to progressive wear of the tip of the cutting tool is prevented.

A further object of the present invention is to provide an automatic tool position compensation system for a numerically controlled machine tool wherein the measurement of the bored hole and the compensation of the dimensions thereof are completely automatically carried out.

The automatic tool position compensating system according to the present invention constitutes part of a numerically controlled machine tool such as boring machine, machining center, or the like, and when the position of a cutting tool tip does not precisely coincide with the basic position previously set in a tape controller based upon a program, or deviates from said basic position due to progressive wear of the tool tip during the machining operation, such deviation of the position of the tool tip from its basic position is automatically measured by a measuring element according to a specific program. The measurement it then calculated and memorized in the controller. After manually clamping the tool selected by the miscellaneous function signal, or after securing the tool to the main spindle by an automatic tool exchanging device, the tool is automatically moved by the amounts previously memorized in the controller in the X-, Y- and Z-directions as well as in other necessary directions radial to the cutting so that the processing can be carried out with the desired accuracy.

BRIEF DESCRIPTION OF THE DRAWINGS

Other features and advantages of this invention will become apparent from the following description taken in connection with the accompanying drawings, wherein there is set forth by way of illustration and embodiment of this invention. In the drawings:

FIG. 1 is a block diagram of a conventional numerically controlled machine tool;

FIG. 2 is a block diagram of a numerically controlled machine tool provided with an automatic tool position compensating system according to the present invention;

In FIGS. 1 and 2 parts which are common are indicated by the same numerals.

Referring to FIG. 1, reference numeral 1 designates a tape reader for reading the taped program, and which in turn feeds the program to a controller. A miscellaneous function device is connected to the controller 3, and a tool off-set compensator 4 is connected to the miscellaneous function device 3 and to the controller to receive signals from the miscellaneous function device 3 and feed signals to controller 2. A numerically controlled machine tool, e.g., a machining center A has a column C and a headstock H mounted on the column C. A main spindle S is provided on the headstock H, and a tool exchanging device E is mounted on the headstock H with tools $B_{1-n}$ therein. Workpiece W to be machined is secured to table F.

Figure 3:
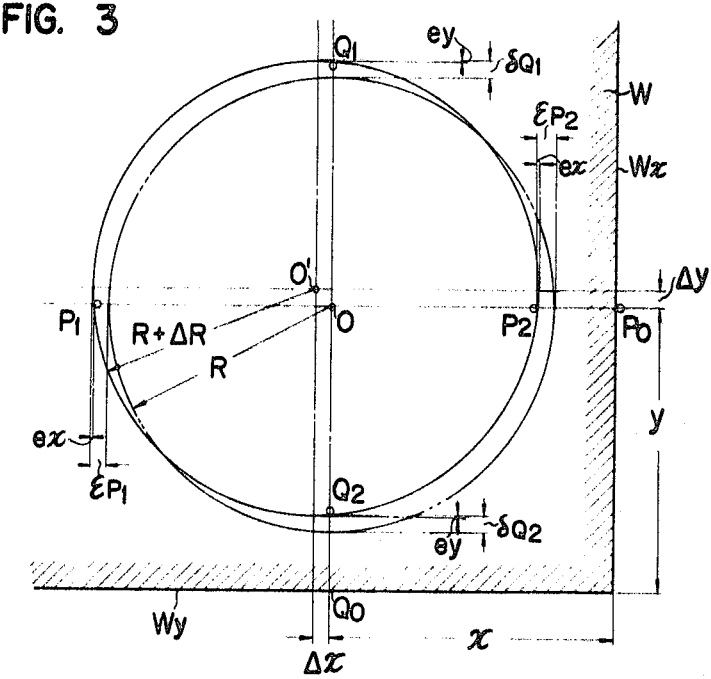
FIG. 3 is a diagram illustrating the compensating procedure for boring when using the numerical controlling system shown in FIG. 2.

In operation, first the operator carries out test cutting on the work W by cutting tools mounted on the main spindle S and upon completion of the test cutting he measures the machined portions precisely in the coordinate directions and the diameters. The deviations from the basic dimension are measured in three directions, that is, the deviation X in the forward and backward directions of the table F of the machine tool A, the deviation Z in the right and left directions thereof, and the deviation Y in the up and down directions of the headstock H mounted on the column C of the machine tool A. After calculating the deviations between the measured dimensions and the basic dimensions previously set in the tape reader, the operator sets the direction and amount of compensation of the cutting tools on the corresponding pushbuttons or dials $D_{1-n}$ of the off-set compensator 4.

Next the controller 2 acts to distribute the machining command pulses concerning the feed direction, feed distance, and feed speed etc., in the forward and backward directions X of the table F, in the right and left directions Z thereof, and in the up and down directions Y of the headstock H, respectively, according to the command information punched on an input tape read by the tape reader so that the revolutions of the feed servo-motors for the table F and headstock H are controlled.

The miscellaneous function device 3 actuates relays or the like according to miscellaneous function signals $t_{1-n}$ read by the tape reader 1 to issue a tool selecting signal for selecting a desired tool from among those kept in a tool storing device (not shown) disposed at an appropriate position on the machine, so that the tool storing device is indexed and sequential operations such as tool loosening and clamping operations are carried out by the automatic tool exchanging device E on the main spindle S. Upon completion of the clamping of the desired tool in the main spindle S, a confirmation signal Fin is delivered to the miscellaneous function device 3 and successive commands are issued from the controller 2 and the miscellaneous function device 3 on the basis of the confirmation signal Fin.

The miscellaneous function signals $t_{1-n}$ are also transmitted simlutaneously to the tool off-set compensator 4 to transmit the compensating signals for the feed direction and feed distance of the tool previously set on the pushbuttons or dials $D_1$, $D_2$ . . . $D_n$ by the operator, so that the compensating signals are transmitted to the controller 2 to compensate for the deviations of the table F in the X- or Z-direction, and headstock H in the Y-direction.

Upon completion of the action of said cutting tool, a signal $t_0$ is issued to the tool off-set compensator 4 based on the information from the tape reader 1 so that the tool is moved so that the deviations set on the pushbuttons or dials $D_1$, $D_2$, . . . $D_n$ are removed and the tool returns to the preset position.

As described above, in order to machine a workpiece with the desired accuracy the operation of the conventional numerically controlled machine requires the precise setting of tools to the basic positions defined by the program. However, due to the errors discussed hereinbefore, errors occur in these positions. Further errors can be introduced by manual measurement of the workpiece, the deviations from which are entered in the tool off-set compensator 4. Such errors are avoided by the system of the present invention.

DESCRIPTION OF THE PREFERRED EMBODIMENT

In FIG. 2, a tape reader 1, a controller 2, and a miscellaneous function device 3 are connected as in the conventional system shown in FIG. 1. However, in addition, there is provided the main body 5 of a measuring element arranged directly under the main spindle S and having an axis within a vertical plane including the axis of the headstock H. The main body 5 is shiftable in the direction of the main spindle S (Z-direction), and has a feeler 6 thereon which is also shiftable in the Z-direction and the tip of which is rotatable so that it moves in the forward and backward directions (X-direction) as well as in the up and down directions (Y-direction). A measured signal processor 7 is connected to the measuring element and comprises a head amplifier, an AD transducer, operation circuits and a memorizing device, etc., and supplies signals to the controller 2 under control of signals from the miscellaneous function device 3. The machine tool A has a table F, head column C, a headstock H mounted on said main spindle S, and an automatic tool exchanging device E mounted to the headstock H, all as in the conventional system shown in FIG. 1.

The controller 2 functions to distribute the command pulses for the feed direction, distance and speed, etc., in the forward and rearward directions X, in the right and left directions Z of the table F, and in the up and down directions Y of the headstock H, the feed servomotors being controlled as in the system shown in FIG. 1.

The miscellaneous function device 3 operates elements such as relays according to the miscellaneous function signals read by tape reader 1 to produce a signal for selecting a desired tool from among the tools $B_{1-n}$ in a tool storing device such as a tool drum or a tool matrix (not shown) suitably mounted on the machine so that an indexing of the tool storing device as well as a sequential operation such as an actuation of the automatic tool exchanging device E, releasing of a tool on the main spindle S, actuation of a clamping mechanism, etc., take place. Upon completion of the clamping of the tool on the main spindle S, a confirmation signal Fin is issued to the miscellaneous function device 3 and the succeeding command signals are issued from the controller 2 and the miscellaneous function device 3.

The operation of the system shown in FIG. 2 when boring the workpiece W on the table F by the machine tool A will be described with reference to FIG. 3. First, the operator secures the workpiece W at a predetermined position on the table F and sets a plurality of cutting tools $B_{1-n}$ necessary to carry out the work in the tool storing device such as a tool drum or a tool matrix. Then the command information from the tape is transmitted to the machine tool A through the tape reader 1, the controller 2 and the miscellaneous function device 3, and one of the desired tools selected from among tools $B_{1-n}$ in the tool storing device is mounted on the main spindle S by the automatic tool exchanging device E. Upon completion of the positioning of the selected tool on the main spindle S, the confirmation signal Fin is transmitted to the miscellaneous function device 3. This is followed by the positioning of the workpiece W and the tool relative to each other by the movements of the table F as well as the headstock H on the basis of the commands from the tape reader 1 in order to bore the hole in the proper place in the workpiece, and finally the machining operation begins upon a command for the main spindle S to rotate a certain number of rotations for the table F to be fed at a certain speed. In this case, it is not necessary that the position of the tip of the selected boring tool be previously finely adjusted so that the radius R precisely coincides with the radius of the hole to be bored. The tape reader 1 is so programmed that when the boring has progressed, say to about 3 mm. deep, the boring is temporarily discontinued and what has been completed is used as a test boring to be followed by the measuring program. The measuring program is carried out according to a program included on the tape.

In FIG. 3 the hole to be bored in the workpiece W is shown by the circle in dot-dash line, wherein the position of the center O of the hole of the program is at the distances $x$ and $y$ from the base surfaces $Wx$ and $Wy$ of the workpiece W, respectively, and the radius of the hole is R.

Let it be assumed that the test hole is that shown by the circle in FIG. 3 in a solid line with its center O' at the distance of $x+\Delta x$ and $y+\Delta y$ from the base surfaces $Wx$ and $Wy$, respectively, and a radius $R+\Delta R$.

The main body 5 of the measuring element together with the feeler 6, which is retracted to a position within the headstock H during the boring, is advanced by known means such as oil pressure, rotation along a screw thread, etc., based upon a command signal from the tape reader 1 and fed through the controller 2 so that the tip of the feeler 6 reaches a definite position in which it projects beyond the tip of the tool. The feeler 6 is the type which, if it lies at a neutral point with respect to the X-, Y- and Z-directions, it is inactive, while if it is at a position which deviates from the neutral point at the point where the feeler 6 comes into contact with the object to be measured, it sends out the direction and the magnitude of the deviation as analogue values of positive or negative voltage by means of a device such as a differential transformer which is well-known in the art. These values are memorized in the signal processer by the head amplifier, the operating ciricuits, etc., as positive or negative pulses.

During the measuring procedure, first the feeler 6 is caused to be advanced out of the headstock H at the command signal, and then its tip is brought into contact with the point Po of the base surface $Wx$ of the work W. Thereupon the distances from the point Po to points where the dot-dash line circle intersects the line passing through the center O and parallel with the X-axis, that is, the programmed dimensions $X+R$ and $X-R$, are supplied. Then the tip of the feeler 6 is moved to the points $P_1$ and $P_2$ where the solid line circle intersects the line passing through the center O, and the feeler 6 is stopped by contact with the workpiece. When there is no difference between the circles O and O' in either their positions or their radii, the measuring element 5 issues no signal since there is no deviation between the actual stopping position and the dimensions $X+R$ and $X-R$. However, if some deviation exists, the element 5 transmits voltages corresponding to the deviations of direction and magnitude to the signal processor 7.

In FIG. 3 the measuring command signals in the X-direction are $X+R$ and $X-R$, respectively, for the points $P_1$ and $P_2$.

Accordingly, the deviation at the point $P_1$ where the inner surface of the bored hole comes into contact with feeler 6 is as follows:

$$\epsilon P_1 = \Delta X + \Delta R - ex \qquad (1)$$

The deviation at the point $P_2$ is as follows:

$$\epsilon P_2 = -(\Delta X - \Delta R + ex) \qquad (2)$$

Therefore, the following equations can be derived:

$$\epsilon P_1 + \epsilon P_2 = 2(\Delta R - ex) \qquad (3)$$

$$\epsilon P_1 - \epsilon P_2 = 2\Delta X \qquad (4)$$

Similarly, the measuring command signals in the Y-direction are $y+R$ and $y-R$ respectively, for the points $Q_1$ and $Q_2$. Accordingly, the deviations at the points $Q_1$ and $Q_2$ where the inner surface of the test bored hole comes into contact with the feeler 6 are expressed as follows:

$$\delta Q_1 = \Delta y + \Delta R - ey \qquad (5)$$

$$\delta Q_2 = -(\Delta y - \Delta R + ey) \qquad (6)$$

Therefore, the following equation can be derived:

$$\delta Q_1 + Q_2 = 2(\Delta R - ey) \qquad (7)$$

$$\delta Q_1 - Q_2 = 2\Delta y \qquad (8)$$

The terms $ex$ and $ey$ are, respectively, the increments in the X- and Y-directions of the spacing of the contacting points from the correct points due to the deviations $\Delta y$ and $\Delta x$ of the center O' from O, and they can be approximately expressed as follows, respectively:

$$ex = \frac{(\Delta y)^2}{2(R+\Delta R - r)} \qquad (9)$$

$$ey = \frac{(\Delta x)^2}{2(R+\Delta R - r)} \qquad (10)$$

wherein $r$ is the radius of the tip of the feeler 6.

From the above Equations (3), (4), (7) and (8), the following relation can be derived:

$$\Delta R = \frac{1}{2}(\epsilon P_1 + \epsilon P_2) + ex = \frac{1}{2}(\delta Q_1 + \delta Q_2) + ey \qquad (11)$$

$$\Delta x = \frac{1}{2}(\epsilon P_1 - \epsilon P_2) \qquad (12)$$

$$\Delta y = \frac{1}{2}(\delta Q_1 - \delta Q_2) \qquad (13)$$

Also, from the Equations (9) and (10), the following relation can be derived:

$$ex/ey = (\Delta y)^2/(\Delta x)^2 = \frac{(\delta Q_1 - \delta Q_2)^2}{(\epsilon P_1 - \epsilon P_2)^2} = k \qquad (14)$$

Further, from the Equations (11) and (14), the following relation can be derived:

$$ey = \frac{1}{2(k-1)} [(\delta Q_1 + \delta Q_2) - (\epsilon P_1 - \epsilon P_2)] \quad (15)$$

$$ex = \frac{k}{(2k-1)} [(\delta Q_1 + \delta Q_2) - (\epsilon P_1 + \epsilon P_2)] \quad (16)$$

Therefore, the following equation can be derived:

$$\Delta R = \frac{1}{2(k-1)} [k(\delta Q_1 + \delta Q_2) - (\epsilon P_1 + \epsilon P_2)] \quad (17)$$

As will be apparent from the above, by detecting the deviations $\epsilon P_1$, $\epsilon P_2$, $\delta Q_1$ and $\delta Q_2$ at the four points $P_1$, $P_2$, $Q_1$ and $Q_2$, respectively, of the test bored hole O' and solving the Equations (12), (13), (14) and (17) the deviations $\Delta x$ and $\Delta y$ of the center O' and deviation $\Delta R$ of the radius R can be calculated.

As is apparent from the Equations (9) and (10), $\Delta x$ and $\Delta y$ are generally quadratic small values so that they may be considered to be negligible. Accordingly, the Equation 17 may be expressed as follows:

$$\Delta R = \frac{1}{2}(\epsilon P_1 + \epsilon P_2) = \frac{1}{2}(\delta Q_1 + Q_2) \quad (18)$$

As stated above, the deviations at the four points are measured, the output voltages corresponding to such deviations are transmitted to the measured signal processor 7, the values $\Delta x$, $\Delta y$ and $\Delta R$ calculated in the operation circuits in the device 7 are memorized in the memory device thereof, and after completion of the measuring program, before the production of the actual hole by the tools $B_{1-n}$, the positive or negative pulses corresponding to $\Delta x$ and $\Delta y$ memorized in the measured signal processor 7 are fed through the controller 2 as position compensating values for moving the table F in the X-direction and for moving the headstock H in the Y-direction in response to a miscellaneous function signal $t'_{1-n}$ from the tape.

Further, as described in copending Japanese patent application No. 14629/1968, U.S. patent application of Tanabe et al. entitled "Main Spindle Device for Machine Tool," filed July 7, 1969, by constructing the main spindle S so that the control of the cutting in the radial direction is possible, the positive or negative pulses corresponding to $\Delta R$ can also be applied to the servo-motor for controlling the depth of cut of the tools $B_{1-n}$ in the radial direction. Thus, both the center position O' and R+$\Delta R$ of the test hole O' are shifted so that the position of the center O and the radius R, respectively, are as previously programmed.

Accordingly, the hole O bored in the workpiece W is compensated for all of the deviations with the exception of the test bored entrance portion of depth of about 3 mm. Upon completion of the operation of the tools $B_{1-n}$ based upon the program, a recurrence signal $t_o$ is transmitted to the measured signal processor 7 through the miscellaneous function device 3 so that the table F and the headstock H move in reverse directions identical with the compensating values $\Delta x$, $\Delta y$ and $\Delta R$ to return them to the positions before the compensation.

In the succeeding operations to produce identical workpieces, whenever the work is machined by any one of the tools $B_{1-n}$, the memorized information $\Delta x$, $\Delta y$ and $\Delta R$ in the measured signal processor 7 is added to or deducted from each dimension X, Y and R fed from the tape in response to miscellaneous function signals $t'_{1-n}$ and the thus corrected values are fed to the respective servomotors from the controller 2 as the positioning dimensions for the new work and the compensated radius for the tools $B_{1-n}$ so that the machining is carried out as previously programmed.

Figure 4:
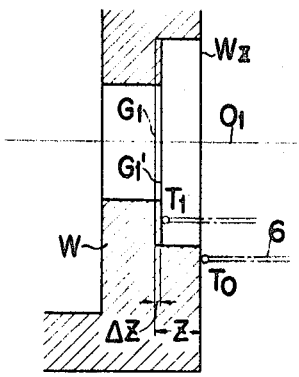
FIG. 4 is a diagram illustrating the compensating procedure when machining stepped holes when using the numerical controlling system shown in FIG. 2.

Measurement in the Z-direction and the steps for compensating will be explained with reference to FIG. 4 wherein the workpiece W is to have hole $O_1$ having a spot faced surface $G_1$. The spot facing of the surface $G_1$ of the workpiece W at a depth Z from the working base surface $W_Z$ in the Z-direction is carried by a spot facing tool from among the tools $B_{1-n}$ upon a command signal from the tape. It is assumed that the surface actually formed is designated by $G'_1$. In the conventional system as shown in FIG. 1, the operator temporarily stops the machine at this stage, measures the depth Z–$\Delta Z$ from the surface $W_Z$ to the spot faced surface $G'_1$ by a suitable measuring instrument, sets the difference $\Delta Z$ between the measured dimension and the programmed dimension Z in the Z-axis of the dials $D_{1-n}$ in the tool off-set compensator 4 of FIG. 1, and carries out the compensation of the position in the Z-direction of the table F in response to the miscellaneous function signal $t_{1-n}$.

However, according to the present invention, the tip of the feeler 6 of the measuring element is advanced from the headstock H in response to a measuring command to bring it into contact with a point $T_o$ on the base surface $W_Z$, and then it is advanced in the Z-direction a distance based upon the programmed signal Z with the point $T_o$ a neutral point, that is, a zero output point until the tip of the feeler 6 comes into contact with a suitable point $T_1$ on the spot faced surface $G'_1$. Then the body of the measuring element transmits a signal corresponding to the deviation $\eta_Z = -\Delta Z$ corresponding to the error $\Delta Z$ indicated by the measured signal to processor 7 to be memorized by it, and during the succeeding operations by the tools $B_{1-n}$ the compensating value $-\Delta Z$ in the memory is fed by a miscellaneous function signal $t'_{1-n}$ whereby the correction is supplied through controller 2 to a servo-motor to perform the position compensation $-\Delta Z$ of the table F in the Z-direction. Thus the spot faced surface $G_1$ according to the program can be produced by the tool $B_{1-n}$.

Although the present invention has been described in connection with a boring machine as an example for compensating the position of the hole and its depth, it will be appreciated that the present invention can also be applied to a machine such as a numerically controlled die sinker wherein, by using a measuring head having feelers which can simultaneously detect deviations in three directions, that is in the X-, Y- and Z-directions, the measuring and the compensation of the position of a metal die are possible. It will be also understood that the body 5 of the measuring element can be located at any suitable position other than that shown in FIG. 2.

What is claimed is:

1. A machine tool adapted to be numerically controlled and having a table, a headstock carrying a main spindle adapted to hold one of a plurality of cutting tools, tool holding and changing means on said main spindle, a controller coupled to said machine tool for effecting the distribution of controlling pulses for actuating the tool holding and changing means for changing the respective cutting tools and for moving the table and headstock to the proper position, a tape reader coupled to said controller for reading information on a tape and feeding it to the controller, a miscellaneous function device coupled to said controller and said main spindle for issuing signals to select one of said cutting tools upon receipt of a controlling pulse from said controller based upon command information read by said tape reader, a measuring element located on said headstock and being movable relative thereto during a measuring procedure at a position spaced from said main spindle, said measuring element being coupled to said controller for sensing the dimensions of the workpiece upon receipt of a command signal from said tape reader through said controller and producing a tool deviation signal representative of the differences between the sensed dimensions and the dimensions called for by command information read by said tape reader, and a measured signal processor coupled to said measuring element and said controller and miscellaneous function device for calculating the deviation between the measured dimension and the corresponding programmed dimensions from the output from said measuring element and to memorize the result of the calculation as a compensating value, whereby said compensating value memorized in said measured signal processor can be transmitted to said controller as pulses so that the compensation of the position of said cutting tools and the table of the machine can be carried out automatically, depending on the dimensions sensed by said measuring means.

References Cited

UNITED STATES PATENTS

| | | | |
|---|---|---|---|
| 3,191,294 | 6/1965 | Daugherty | 29—568 |
| 3,254,548 | 6/1966 | Gersch | 77—58.34 |

FRANCIS S. HUSAR, Primary Examiner

U.S. Cl. X.R.

77—3 P